April 1, 1924.
M. O. JOHNSON
MACHINE AND METHOD FOR SLICING FRUIT AND PREPARING SAME FOR CANNING
Filed April 15, 1922
1,489,034
4 Sheets-Sheet 1
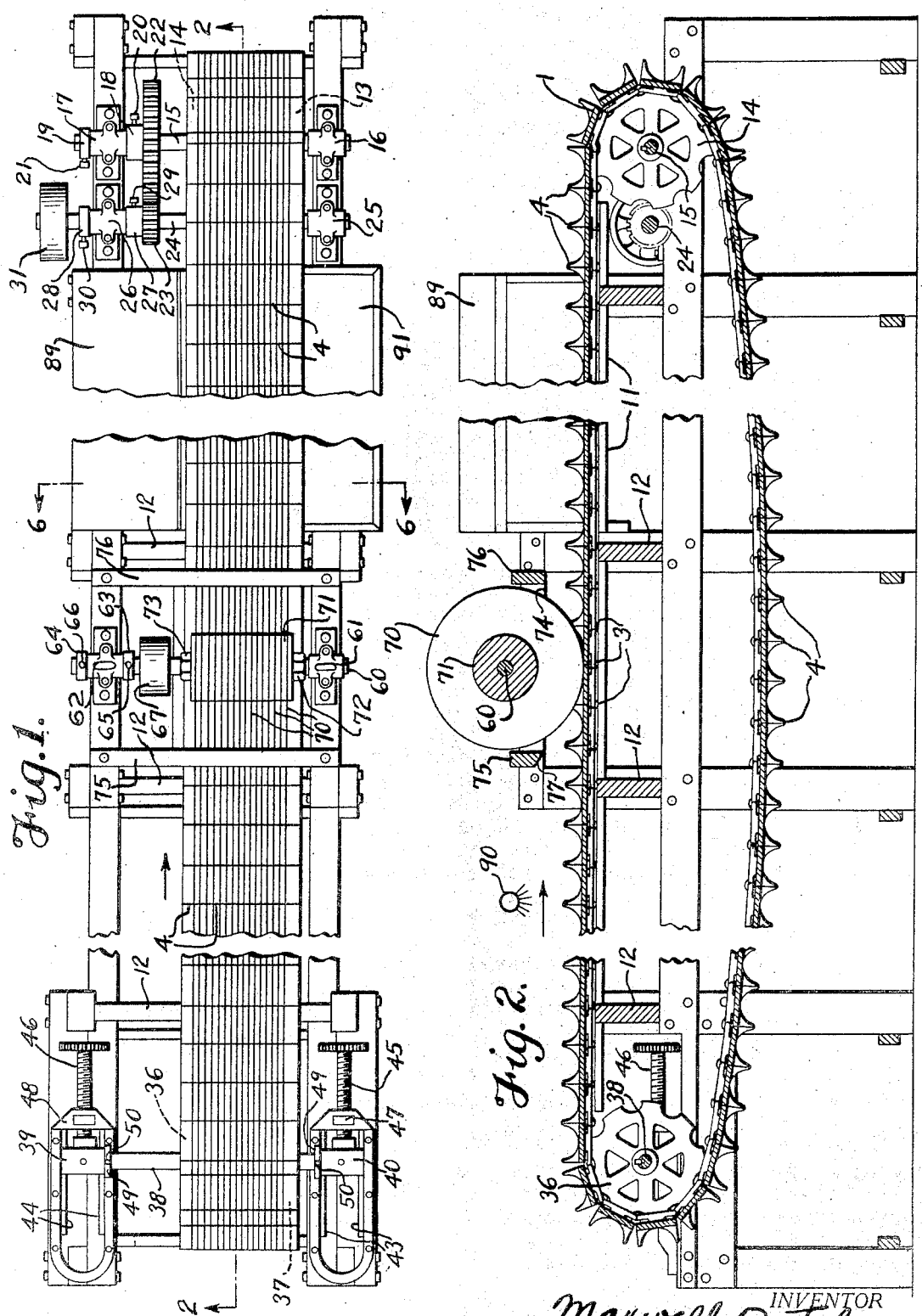

April 1, 1924.   1,489,034
M. O. JOHNSON
MACHINE AND METHOD FOR SLICING FRUIT AND PREPARING SAME FOR CANNING
Filed April 15, 1922   4 Sheets-Sheet 2

Maxwell O. Johnson INVENTOR
BY John D. Morgan ATTORNEY

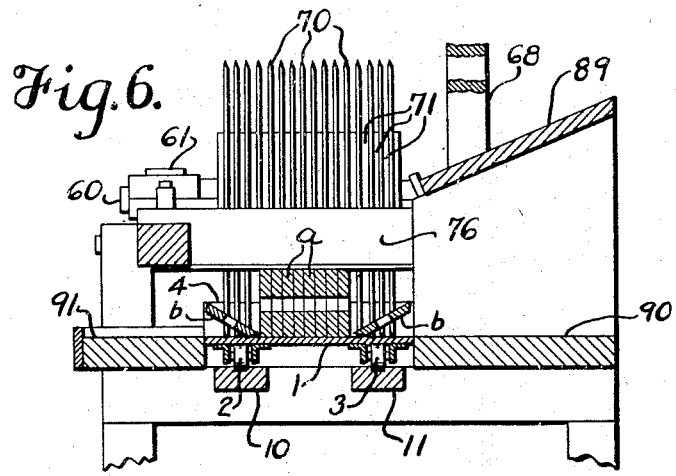

April 1, 1924. 1,489,034
M. O. JOHNSON
MACHINE AND METHOD FOR SLICING FRUIT AND PREPARING SAME FOR CANNING
Filed April 15, 1922 4 Sheets-Sheet 4

Patented Apr. 1, 1924.

1,489,034

UNITED STATES PATENT OFFICE.

MAXWELL O. JOHNSON, OF WAIPIO, TERRITORY OF HAWAII.

MACHINE AND METHOD FOR SLICING FRUIT AND PREPARING SAME FOR CANNING.

Application filed April 15, 1922. Serial No. 553,214.

*To all whom it may concern:*

Be it known that I, MAXWELL O. JOHNSON, a citizen of the United States, residing at Waipio, in the county of Honolulu and Territory of Hawaii, have made certain new and useful Improvements in Machines and Methods for Slicing Fruit and Preparing Same for Canning, of which the following is a specification.

The invention relates to a machine and method for slicing and further preparing or handling fruits for canning, and more especially to such a novel machine and method for preparing sized fruits, such as sized pineapples, by slicing and otherwise for canning.

Objects and advantages of the invention will be set forth in part hereinafter, and in part will be obvious therefrom, or may be ascertained through practice with the invention.

The invention consists in the novel parts, constructions, arrangements, combinations, improvements, steps, and processes herein shown and described.

The accompanying drawings, herein referred to and constituting a part hereof, illustrate one embodiment of the invention, and together with the description serve to explain the principles thereof.

Of the drawings:—

Fig. 1 is a top plan of a machine embodying the invention;

Fig. 2 is a vertical central longitudinal section taken substantially on the line 2—2 of Fig. 1;

Fig. 5 is a transverse vertical section, taken substantially on the line 5—5 of Fig. 4;

Fig. 6 is a transverse vertical section, taken substantially on the line 6—6 of Fig. 1;

Fig. 7 is a fragmentary detail in plan showing additional or alternative aligning means for the traveling fruit holders;

Fig. 8 is a fragmentary transverse section, with parts omitted, taken substantially on the line 8—8 of Fig. 7;

Figure 3:
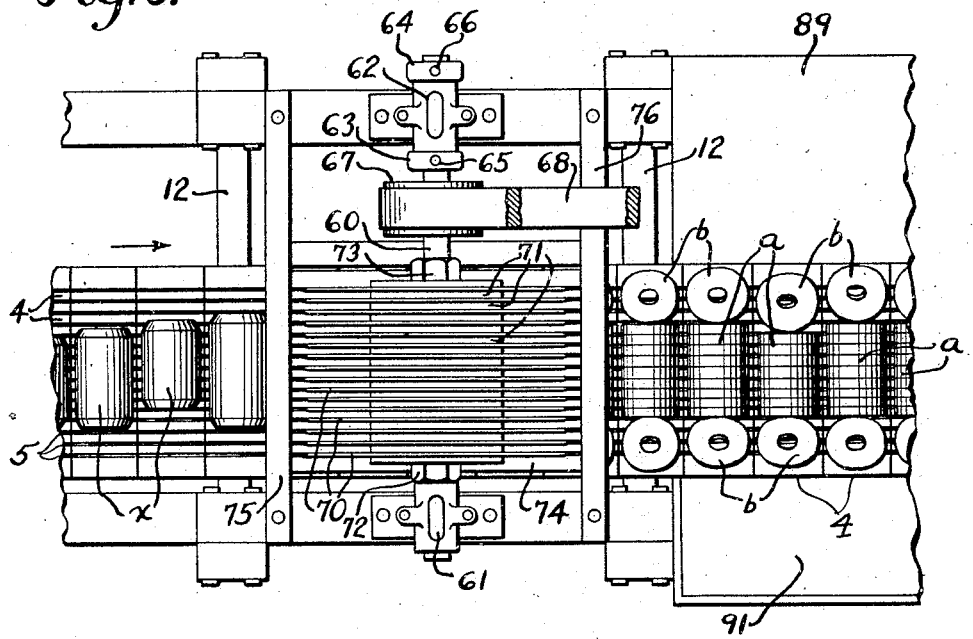
Fig. 3 is a fragmentary plan, on an enlarged scale, of the central part of Fig. 1, showing the slicing operation.

In the exemplified embodiment of the invention, it is shown especially adapted for operating upon sized pineapples, although it will be understood that in its broader aspects the invention is of more general application.

In the work of canning pineapples, the fruit is "sized," that is, a cylindrical central portion is cut out longitudinally of the fruit of a size to fit neatly within the cans, and at the same time the central pithy and unedible portion is cored out of this cylindrical portion, leaving a cylindrical opening longitudinally of the cylindrical sized piece of fruit. This cylindrical portion, as stated, is of a size to fit snugly within the can, and this is therefore called the "sized" fruit. The ends of this cylindrical portion are then cut off, leaving the above described cylindrical portion of the fruit, but usually with a slight bevel of the unpeeled exterior remaining at either end. These two beveled ends later provide two additional slices over the perfect cylindrical parts, these beveled slices being "seconds." The sized fruit is thus all of the same cylindrical dimension although varying in length according to the size of the fruit. The two beveled ends of the sized cylinders of fruit are peeled or "trimmed" preparatory to the slicing operation.

The present invention is directed to providing a method and mechanism for easily and expeditiously feeding the sized fruit to the slicing mechanism, and for slicing the fruit, and for presenting or disposing the sliced fruit in position and condition for sorting and packing, that is, for quick handling in sorting out the "second" slices and in presenting the perfect slices, undisturbed from their original position, for rapid and easy insertion into the cans.

Referring now in detail to the embodiment of the invention, illustrated by way of example in the accompanying drawings, the machine comprises a slicing mechanism and a fruit holding mechanism having relative movement to effect the slicing operation. As so embodied the fruit holding mechanism also effects the feeding operation, and consists of a concatenated series of individual fruit holders traveling in an endless path past a non-traveling but rotatable slicing mechanism, which is preferably a gang slicer, cutting the entire fruit into slices at one time. The endless traveling series of fruit holders is disposed horizontally at either side of the slicing station, at one side thereof constituting a feeding table for the fruit to be sliced, and at the other side thereof constituting a delivery table from which the slices can be sorted and packed.

Referring now to the embodied structural details, the fruit holding and feeding mechanism comprises individual holders, or pocketed blocks 4. These are hollowed on their upper parts and are proportioned to hold and fit the sized fruit, and comprise bases or backs 1 fixed to a pair of endless parallelly arranged roller chains 2 and 3, the chains being jointed correspondingly with the abutting sides of the fruit holders. The fruit holders are kerfed as shown at 5 to permit the passage therethrough of the slicing blades during the slicing operation.

In the upper reach of the feeding mechanism, which is preferably horizontally disposed, the rollers of the chains 2 and 3 run on trackways 10 and 11, which are preferably provided with channels or grooves for the rollers, as shown in Figs. 5 and 6. The trackways are supported on any suitable framing, and as shown herewith, cross-reaches 12 in the frame are provided, supporting the rails 10 and 11, these cross-reaches being mounted on the general framing of the machine.

Means are provided for guiding and driving the endless train of fruit holders along their path of travel, and as embodied driving wheels 13 and 14, engaging with the respective roller chains 2 and 3, are fixed upon a shaft 15, which shaft is journaled in bearings 16 and 17, mounted on the machine frame. The shaft 15 is movable longitudinally of itself by suitable means to secure accurate transverse alignment of the kerfed fruit holders relatively to the slicing mechanism, and as embodied a collar 19 is carried on the shaft at one side of the bearing 17, and the hub 18 of gear wheel 22 serves the same purpose on the other side of the bearing, and these are provided, respectively, with clamping screws 20 and 21.

In the embodied form of driving means, there is fixed on shaft 15 a gear wheel 22, and in mesh therewith is a pinion 23. Pinion 23 is fixed on a shaft 24, which shaft is journaled in bearings 25 and 26, mounted on the machine frame. This shaft is provided with corresponding longitudinally aligning means comprising a collar 28 on one side of bearing 26, and the hub 27 of pinion 23 serves the same purpose on the other side of the bearing. These are provided, respectively, with clamping screws 29 and 30. Shaft 24 is driven by suitable means, such as a belt pulley 31.

At the opposite end of its path of travel, the fruit holder and conveyer is provided with a pair of idle wheels 36 and 37 for supporting and guiding the roller chains 2 and 3. The wheels are fixed on a shaft 38, journaled in bearings 39 and 40, which are of any standard or suitable sliding or take-up type, to regulate the tension or slack in the fruit conveyer. As embodied these bearings are slidable, respectively, on guides 43 and 44, by means of corresponding screw rods 45 and 46, screw-threaded into the frames of the bearings, respectively, at 47 and 48. The shaft 38, like shafts 15 and 24, is longitudinally movable to provide transverse alignment of the fruit holders relatively to the slicing mechanism as already described. For this purpose, two collars 49 are carried on the shaft at each of its bearings, the collars being positioned by clamping screws 50.

In the present preferred embodied form of slicing means, the slicers are non-traveling, rotary circular discs, a gang thereof working in the corresponding kerfs in the fruit holder units to completely slice the fruit at one operation as the traveling fruit holders pass the slicer. As embodied, a shaft 60 is journaled in bearings 61 and 62 on the machine frame, the shaft being longitudinally movable to maintain the slicing blade in exact register or alignment with the kerfs in the fruit holders by suitable means, and as embodied collars 63 and 64 are provided at either side of the bearing 62, having respectively clamping screws 65 and 66. The shaft 60 is driven in any suitable manner, and as shown is provided with a pulley 67 over which runs a driving belt 68.

As embodied, the slicer comprises a plurality of circular slicing discs 70, mounted on the shaft 60, the discs being sharpened to a cutting edge on their peripheries. Between the discs 70 are spacing collars 71, which maintain the slicing discs at the proper slicing distance apart, corresponding to the distance between the kerfs 5 in the fruit holders. It will be understood that the proportionate thickness of the discs 70 in the drawings is greatly exaggerated for the sake of clearness in the showing. The discs are held together, and in alignment on the shaft 60, and so as to rotate with the shaft, by suitable means, and as shown herein, nuts 72 and 73 are screw-threaded on the shaft 60 and press against the discs 71 at either side for the purpose described.

Figure 4:
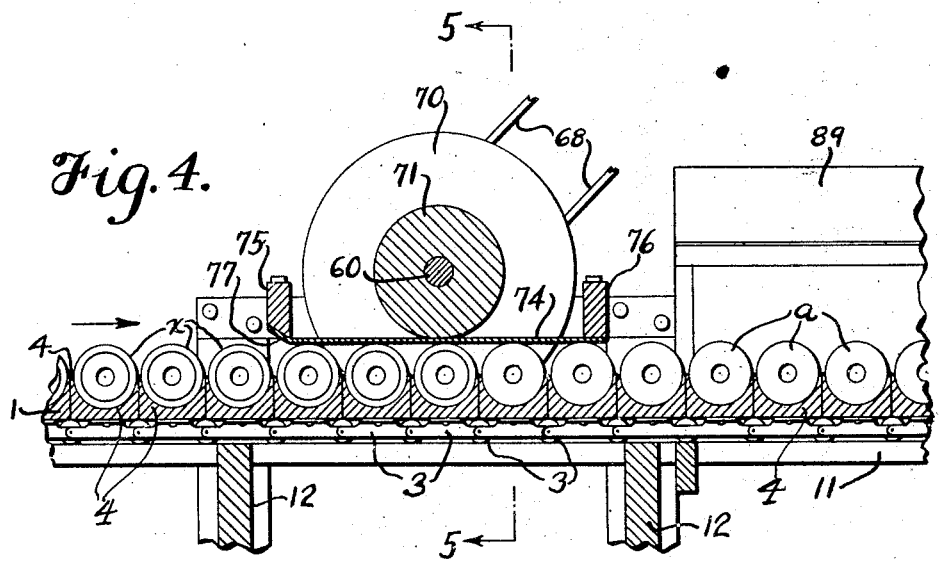
Fig. 4 is a section, likewise on an enlarged scale, of the upper central part of Fig. 2, showing the slicing operation.

Further means are provided, if desired, and are preferably employed, for maintaining the slicing discs 70 in alignment, and as embodied, a plate 74 is horizontally disposed beneath the discs 71, and has slots formed therein (Figs. 4 and 5) through which the slicing discs 70 project. The plate 74 is mounted on the under side of the frame cross-pieces 75 and 76, and is preferably provided with a beveled part 77 to facilitate the entry of the fruit thereunder as they approach the slicer, as will best appear from Fig. 4.

In Figs. 7 and 8 an additional or alternative form of alining means is shown, comprising a pair of rollers 80 and 81, bearing on the opposite sides of the train of passing fruit holders, the rollers being in alignment with each other, and each provided with adjustable positioning means. As embodied, each roller is journaled in a yoked holder 82 and 83, respectively, the holders having flat supporting parts 84 and 85 respectively, having bolt and slot adjustments 86 and 87, whereby the rollers and therewith the train of fruit holders may be transversely positioned to bring them into exact alignment and registry with the slicers.

If desired, the fruit may be washed previous to slicing, and in Fig. 2 a sprayer 90 is shown for this purpose. Belt conveyors of any known or suitable form may be employed to feed the fruit to the slicing mechanism and to convey it away therefrom, or any other standard or convenient form of feeding or delivery mechanism may be employed, or the fruit can be placed in the holders by hand.

The machine has very large slicing capacity and at the same time the mechanism operates at relatively slow speed, as there is no idle or return movement of the mechanisms, and the fruit holding units are joined closely one to another. The usually violent slicing action is thereby avoided.

The fruit is also kept in position, undisturbed by the slicing action, and is not dropped or thrown about at the end of the slicing operation. This produces a very high output of perfect slices, with practically no wastage from marred or broken slices, and leaves the fruit undamaged, unscattered and undisturbed, and thereby facilitates and simplifies the next succeeding step in the canning as will be later described. Likewise, there is no labor of gathering the sliced fruit together after slicing preparatory to canning.

The work of feeding the fruit to the machine may be also much more safely, leisurely and conveniently done, on account of this relatively slower movement of the feeding mechanism and also the large space in which the feeding may be done. The fruit holding units also hold the fruit so that it is always truly and properly presented to the slicing mechanism so as to obtain perfect slices, thereby avoiding wastage from this source also. There is no need of alining the fruit transversely in the holders, as the slicer is the full width of the holders.

The trimming mechanism and the conveyor for conveying the sized fruit thereto may be located closely adjacent to the fruit conveyor and the trimmed fruit may be taken directly from the trimmer and placed in the holders for conveyance through the slicer.

The horizontal top reach of the endless fruit holder and conveyor beyond the slicing mechanism (to the right in Figs. 1 and 2), is preferably employed for performing at least a part of the sorting and canning operations direct from the fruit holders.

As embodied (Figs. 1 to 6), a table 89 is provided, whereon are placed trays of cans and therebeneath is a table 90 for supporting the trays whereon are placed the filled cans of perfect slices or "firsts". The trays of filled cans are thence removed by the "truckers" in the usual manner. A table 91 is provided at the opposite side of the fruit holder or conveyor, and at this table an operator sorts the fruit and fills the cans.

Figure 9:
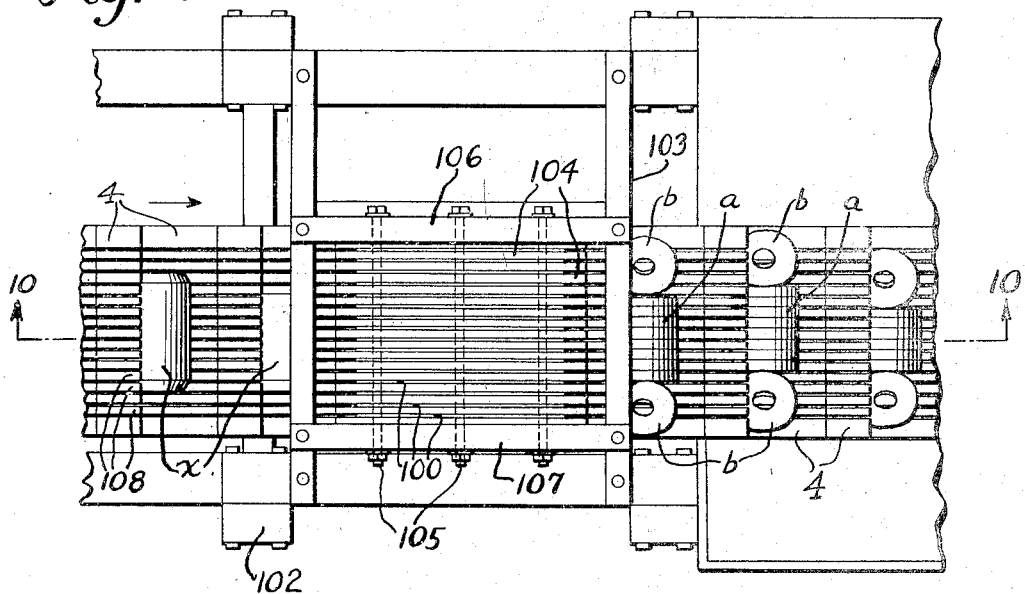
Fig. 9 is a fragmentary top plan, corresponding to Fig. 3, but showing a different form of the fruit holders and slicers.

In the form of the fruit holders in the present invention, the perfect slices or "firsts" remain in position, as shown at $a$ in Figs. 3 and 9, while the two end slices, owing to their beveled peripheries, drop down on their sides as shown at $b$ in said figures, thereby automatically effecting the sorting of the slices. This puts the "seconds" out of the way until the perfect slices between them are removed. In this machine, as already explained, all the intervening slices are perfect. To remove the perfect slices, an attendant passes a short stick through the hollow center of the perfect slices, which are then lifted and inserted directly into the cans, while the machine continues in operation. The filled cans are placed on the trays on table 90 as already described. The imperfect slices can then be removed and placed in other trays or cans as desired.

Figure 10:
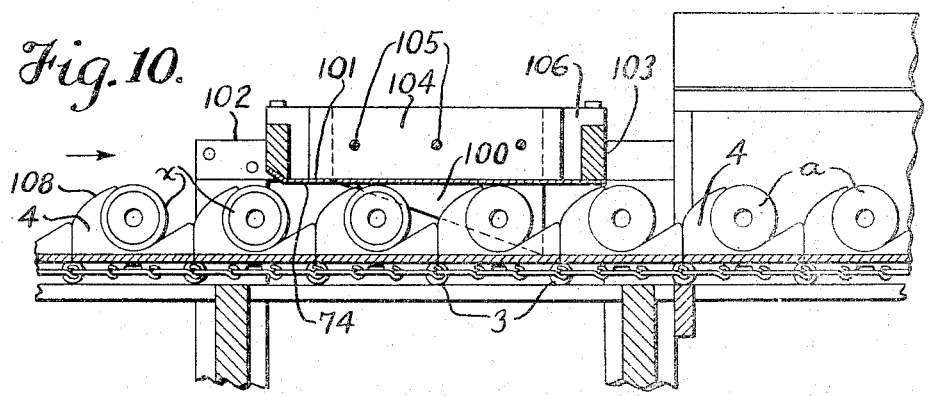
Fig. 10 is a longitudinal vertical section taken substantially on the line 10—10 of Fig. 9.

In Figs. 9 and 10 a different form of the slicers and fruit holders is shown, wherein the slicers are stationary beveled blades 100. These blades are fixed to a supporting plate 101, carried on the frame cross-pieces 102 and 103, the blades being beveled downwardly in the direction of the travel of the fruit holders, and being spaced apart to give slices of the desired thickness.

Spacing blocks 104 are placed between the blades, corresponding to the thickness of the slices, and the blades and spacing blocks are bolted together by a series of bolts 105 passing therethrough and through the frame pieces 106 and 107 at either side. In this form the fruit holders have their curved side at the rear of the fruit, as it travels through the machine, extended above the other side, as shown at 108 in Fig. 10, to hold the fruit against this pressure of the stationary slicers during the slicing operation.

From all the foregoing it will be understood that a machine and method have been provided realizing the objects and advantages hereinbefore set forth, together with other objects and advantages; and also that departures may be made from the exact structures shown and described, within the scope of the accompanying claims, without departing from the principles of the invention, and without sacrificing its chief advantages.

What I claim is:—

1. The method of preparing sized pineapples for canning which comprises sizing the fruit and beveling the ends thereof, supporting the sized fruit on its cylindrical side and slicing it thereby causing the beveled end slices to drop and leaving the first quality slices intact, and running a support through the core of the intact first quality slices and lifting them together into a can.

2. The method of preparing pineapples for canning, comprising sizing the fruit and beveling the ends thereof, supporting the sized fruit on its cylindrical side and slicing it, thereby causing the beveled end slices to drop and thus separate themselves automatically from the better slices.

3. A slicing machine, comprising an endless conveyor, kerfed holders carried thereby, a plurality of slicer blades arranged in the path of the kerfed holders, and means for laterally adjusting the kerfed holders for aligning the kerfs with the slicer blades.

4. A slicing machine, comprising an endless conveyor, kerfed holders carried thereby, a plurality of slicer blades arranged in the path of the kerfed blades, and means for laterally adjusting both the kerfed holders and the slicer blades for bringing the kerfs and the blades in alignment with each other.

5. A slicing machine comprising an endless conveyor, kerfed holders carried thereby, a plurality of slicer blades arranged in the path of the kerfed holders, and means, engageable with the kerfed holders as they pass by, for moving them in a substantially rectilinear path so that the kerfs are in alinement with the slicer blades.

6. A slicing machine comprising an endless conveyor, kerfed holders carried thereby, a plurality of slicer blades arranged in the path of the kerfed holders, and laterally adjustable elements engageable with the vertical sides of the kerfed holders as they pass by, for moving the holders in a substantially rectilinear path so that the kerfs are in alinement with the slicer blades.

7. A slicing machine comprising an endless conveyor, kerfed holders carried thereby, a plurality of slicer blades arranged in the path of the kerfed holders, means for laterally adjusting the slicer blades, and means engageable with the kerfed holders as they pass by for moving them in a substantially rectilinear path, both said means serving to bring the slicer blades and kerfs into alinement.

8. A slicing machine comprising an endless conveyor, kerfed holders carried thereby, a plurality of slicer blades arranged in the path of the kerfed holders, means for laterally adjusting the slicer blades, and means for engaging with the kerfed holders as they pass by for moving them in a substantially rectilinear path, both said means serving to bring the slicer blades and kerfs into alinement.

9. A slicing machine comprising an endless conveyor, kerfed article holders carried thereby, slicer blades cooperating therewith, the conveyor extending for a substantial distance beyond the slicer blades, and means located adjacent the extended portion of the conveyor for holding empty receptacles, filled receptacles, and receptacles in a position for an operator to fill them with sliced material.

10. A slicing machine comprising an endless conveyor, kerfed holders carried thereby, a plurality of slicer blades adapted to pass through the several kerfs in the said holders, channeled guideways below the upper reach of the conveyor, and two sets of rollers, one set on each side of the conveyor carried on the inside periphery of the conveyor and running in said channeled guideway.

11. A slicing machine comprising an endless conveyor, kerfed holders carried thereby, a power driven shaft, a plurality of slicer blades carried thereby, and means for adjustably positioning the shaft in a direction at right angles to the conveyor, for positioning the slicer blades with respect to the kerfed holders.

12. A slicing machine comprising an endless conveyor, kerfed holders carried thereby, a power driven shaft, means for laterally moving the kerfed holders in a substantially rectilinear path, at right angles to the conveyor, a plurality of slicer blades carried thereby, and means for adjustably positioning the shaft in a direction at right angles to the conveyor, for positioning the slicer blades with respect to the kerfed holders.

In testimony whereof I have signed my name to this specification.

MAXWELL O. JOHNSON.